United States Patent
Burek et al.

(10) Patent No.: US 9,846,290 B1
(45) Date of Patent: Dec. 19, 2017

(54) TOOL SYSTEM FOR ROUTING AN OPTICAL FIBER OR CABLE THROUGH WALLS AT CUSTOMER PREMISES

(71) Applicant: OFS Fitel, LLC, Norcross, GA (US)

(72) Inventors: Denis E Burek, Cumming, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/281,520

(22) Filed: Sep. 30, 2016

Related U.S. Application Data

(60) Provisional application No. 62/347,711, filed on Jun. 9, 2016.

(51) Int. Cl.
G02B 6/00 (2006.01)
G02B 6/44 (2006.01)
G02B 6/46 (2006.01)

(52) U.S. Cl.
CPC ......... *G02B 6/4459* (2013.01); *G02B 6/4466* (2013.01); *G02B 6/46* (2013.01)

(58) Field of Classification Search
CPC .................................................. G02B 6/4459
See application file for complete search history.

(56) References Cited

U.S. PATENT DOCUMENTS

| | | | | |
|---|---|---|---|---|
| 5,480,203 A * | 1/1996 | Favalora | ................. | B25B 25/00 24/115 N |
| 5,611,707 A * | 3/1997 | Meynier | ............ | H01R 13/6277 439/353 |
| 7,246,789 B2 * | 7/2007 | Ames | ..................... | H02G 1/081 254/134 |
| 8,186,034 B2 * | 5/2012 | Vitito | .................. | B60N 2/4876 254/134.3 CL |
| 8,385,712 B2 * | 2/2013 | Ahmed | ................ | G02B 6/4463 29/438 |
| 8,906,178 B2 | 12/2014 | Burek et al. | | |
| 2005/0251237 A1 * | 11/2005 | Kuzma | ................ | A61N 1/0551 607/116 |
| 2009/0226140 A1 * | 9/2009 | Belenkiy | ............. | G02B 6/3898 385/134 |
| 2010/0054680 A1 * | 3/2010 | Lochkovic | ............ | B65H 75/14 385/135 |
| 2016/0097911 A1 | 4/2016 | George et al. | | |

OTHER PUBLICATIONS

TII Technologies Inc., FIT Fiber Installation Tool, specification sheet (2016).

* cited by examiner

*Primary Examiner* — Sung Pak
(74) *Attorney, Agent, or Firm* — Law Offices of Leo Zucker, Esq.

(57) ABSTRACT

A tool system for threading an optical fiber through a hole formed in a wall at customer premises, and for protecting the fiber inside the wall. A tool body has forwardly projecting fingers for capturing a connector at an end of the fiber from a direction approaching a front face of the connector. A back end of the tool body is arranged to engage a rod handle of such length that its free end can be threaded through the hole and out the opposite side of the wall. Using the handle, the tool body is pulled through the hole along with a captured connector and associated fiber. A hole plug has a hollow cylindrical body and an access slit for passing the fiber inside the body for protection. The plug body has teeth for engaging the premises wall and retaining the plug at a desired angular position in the wall.

17 Claims, 4 Drawing Sheets

TOOL SYSTEM FOR ROUTING AN OPTICAL FIBER OR CABLE THROUGH WALLS AT CUSTOMER PREMISES

CROSS REFERENCE TO RELATED APPLICATION

This application claims priority under 35 U.S.C. §119(e) of U.S. Provisional Patent Application No. 62/347,711 filed Jun. 9, 2016, titled "Alternative Route Solutions For Routing InvisiLight® Optical Fiber," the entire contents of which are incorporated by reference.

BACKGROUND OF THE INVENTION

Field of the Invention

The present invention relates to tools and parts for installing communication lines at customer premises, and particularly to a tool system for routing an optical fiber or cable through walls inside the premises.

Discussion of the Known Art

Materials and instructions for a procedure that enables an installer to route and bond an optical fiber or cable over exposed surfaces at customer premises, in minimal time and with little or no permanent visual impact, are available from OFS Fitel, LLC under the registered mark InvisiLight®. See U.S. Pat. No. 8,906,178 (Dec. 9, 2014) and U.S. Pub. 2016/0097911 (Apr. 7, 2016), both of which are incorporated by reference. During an InvisiLight installation, a consumer grade, nonhazardous, water based adhesive is used to bond buffered fibers or jacketed indoor cables to walls, ceilings, moldings and other accessible structural surfaces over a determined routing path at the premises.

Sometimes the routing path will pass through walls located between an entrance to the premises, and a fiber termination point inside the premises. For such installations, a hole is drilled through each wall along the path, and the fiber or cable is threaded through the hole using a tool in the form of an elongated sleeve having an axial slit and an outward flare at a distal end of the tool. See FIGS. 12 and 15, and related text of the above referenced U.S. Pat. No. 8,906,178. A leading end length of the fiber is urged through the slit so that a connector at the end of the fiber nests in the flare at the distal end of the tool, and the connector housing is removed leaving only the connector ferrule.

While holding a near or proximal end of the tool, an installer threads the distal end of the tool with the nested ferrule and fiber through the hole until the fiber emerges from the opposite side of the wall. The tool is removed from the fiber, and enough fiber is drawn through the hole from the opposite side of the wall for routing over a remaining portion of the installation path.

It is often very difficult and time consuming for the installer to thread the tool together with the fiber at the leading end through the hole from one side of the wall and out the opposite side of the wall, and then to remove the tool from the fiber. As a result, valuable installation time is lost. Accordingly, there is a need for a tool that enables an optical fiber or cable to be threaded through an opening or hole in a premises wall quickly and easily.

In addition, once threaded through the hole, the fiber or cable is protected by passing it through an access slit formed over the length of each of two hollow plugs, and inserting the plugs into the hole from both sides of the wall with the fiber safely surrounded by the plugs. The plugs are set at a desired angular position with respect to the hole on each side of the wall, and are closed at their open ends in a manner that allows the fiber to be adhered on each side of the wall next to the plug without having to bend the fiber critically. In some installations, a fiber module may be installed over the hole on one side of the wall, in which case only one plug is inserted into the hole from the opposite side of the wall. See FIGS. 12 to 16 and related text of the mentioned U.S. Pat. No. 8,906,178.

Premises walls in the United States are typically about 4.5 to 6.5 inches thick, and hole plugs used in InvisiLight or other kinds of installations are sized for such walls. As mentioned, each plug is inserted into a wall hole after a fiber or cable is threaded through the hole and passed through the access slit in the plug body. Before inserting each plug into a hole, however, an adhesive is usually applied on the outside surface of the plug in order to retain the plug securely in the wall once the adhesive cures.

In certain countries outside the United States, walls inside customer premises are often less than 4.5 inches thick. When threading a fiber or cable through a hole in such walls, the fiber still must be protected inside the wall by passing it inside a plug that is inserted into the hole from one or both sides of the wall. Because the length of the plugs must be reduced to accommodate the thinner walls, however, the plugs may not have sufficient area on their outside surface for depositing enough adhesive to retain them securely in the wall. Accordingly, there is a need for a wall hole plug for use when routing optical fibers and cables through relatively thin walls, whether within or outside the United States, wherein the plug can be retained firmly in the wall at a desired angular position without the use of an adhesive.

SUMMARY OF THE INVENTION

According to the invention, a tool for threading an optical fiber or cable through an opening or hole formed in a wall along a determined routing path at a customer premises, includes an elongated generally cylindrical body, a collar formed at a rear end of the body, and a head portion formed at a front end of the body. The head portion includes a pair of fingers that project axially forward, and the fingers are dimensioned and arranged to capture an optical connector at an end of a fiber or cable from a direction that approaches a front face of the connector. The collar at the rear end of the body is formed and arranged to engage an elongated tool handle.

According to another aspect of the invention, a plug for insertion into an opening or hole formed in a wall along a determined routing path at a customer premises, includes a hollow generally cylindrical body having an open top end, an open bottom end, and an access slit formed along the length of the body for passing an optical fiber or cable inside the body to protect the fiber or cable once threaded through the hole. The plug body has a group of radially outwardly projecting teeth on its outside circumference for engaging the premises wall, and for retaining the plug at a desired angular position with respect to the opening in the wall.

According to a further aspect of the invention, a tool system for threading an optical fiber or cable through an opening or hole formed in a wall along a determined routing path at a customer premises, includes a tool having an elongated generally cylindrical body, a collar formed at a rear end of the body, and a head portion formed at a front end of the body. The head portion includes a pair of fingers that project axially forward, and the fingers are dimensioned and arranged to capture an optical connector at an end of a fiber or cable from a direction that approaches a front face of the connector. The collar at the rear end of the body is formed and arranged to engage an elongated tool handle.

The system also includes a plug for insertion in the opening or hole in the wall at the customer premises. The plug has a hollow generally cylindrical body having an open top end, an open bottom end, and an access slit formed along the length of the body for passing an optical fiber or cable inside the body to protect the fiber or cable once threaded through the hole. The plug body has a group of radially outwardly projecting teeth on its outside circumference for engaging the premises wall, and for retaining the plug at a desired angular position with respect to the opening in the wall.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
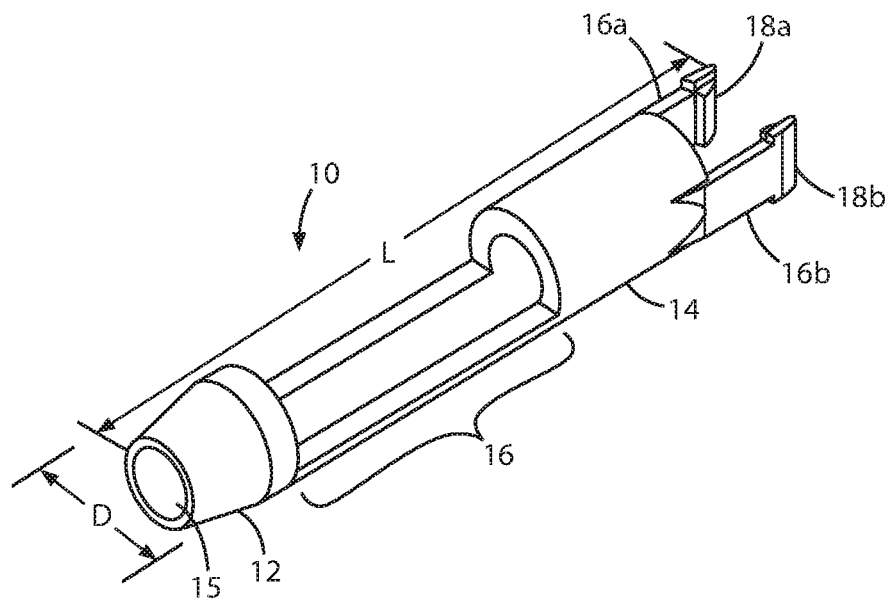
FIG. 1 is a view of a tool head for threading an optical fiber or cable through a hole in a premises wall, according to the invention.

FIG. 1 shows a tool 10 for threading an optical fiber or cable through an opening or hole in a premises wall, according to the invention. The tool 10 has an elongated, generally cylindrical body that can be molded of, e.g., polypropylene copolymer or an equivalent material. The tool body forms a collar 12 at a rear end of the body, and a head portion 14 at a leading or front end of the body. In the illustrated embodiment, an opening 15 is formed axially through the collar 12 for receiving and engaging an elongated tool handle (see FIG. 2). A section 16 of the length of the tool body, intermediate the collar 12 and the head portion 14, is open over an arc of approximately 120 degrees. The tool 10 has an overall length L of, e.g., approximately 2.259 inches and an outside diameter D of, e.g., approximately 0.352 inch.

Figure 2:
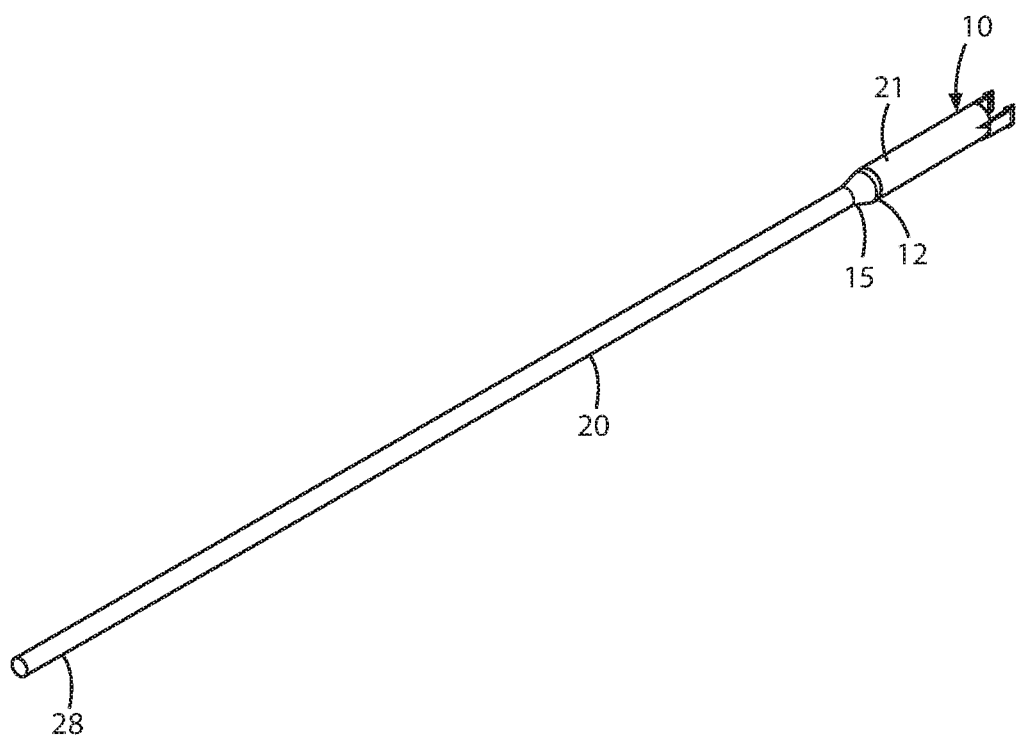
FIG. 2 shows the tool head in FIG. 1 with an attached rod handle.

FIG. 2 shows the tool 10 in FIG. 1 with an elongated rod handle 20 attached to the tool body. The handle 20 may be formed of, e.g., acrylonitrile butadiene styrene (ABS) and measure, for example, about 12 inches in length by about 0.200 inch in diameter. After applying a suitable adhesive to a distal end 21 of the handle 20, the end 21 is inserted with a close fit through the collar 12 at the rear end of the tool body and partially through the head portion 14 at the front end of the body, thus fixing the handle 20 in axial alignment to the tool body as shown in FIG. 2. Instead of applying an adhesive, the end 21 of the handle that is exposed at the open section 16 of the tool body can be secured to the body by tape.

Figure 3:
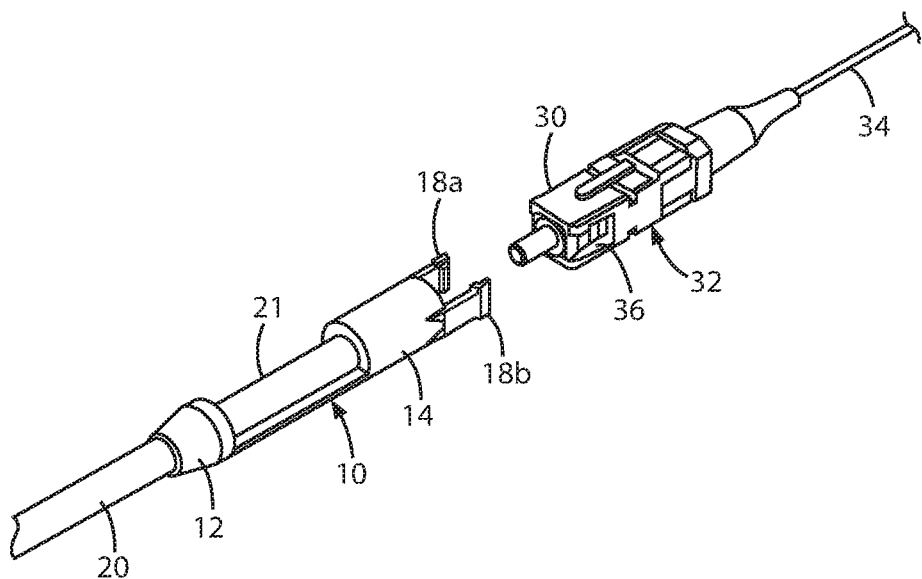
FIG. 3 is a view of the tool head and handle in FIG. 2, in position to capture a connector at one end of a fiber to be threaded through the premises wall.

The head portion 14 of the tool body has a pair of parallel, diametrically opposed fingers 16a, 16b that project forward in the axial direction of the head portion as shown in the drawing. The free ends of the fingers 18a, 18b are hooked or barbed, and are dimensioned so that when urged over a front face 30 of a connector 32 at an end of an optical fiber or cable 34 as in FIG. 3, the fingers 16a, 16b spread apart until the free ends 18a, 18b engage the connector 32 at corresponding recesses 36 in the sides of the connector. See FIG. 4. Although a type SC optical connector is shown in the drawing, it will be understood that the inventive tool 10 may constructed to engage or capture other types of connectors for the purpose of threading fibers or cables that are terminated by the connectors through a wall opening.

Figure 4:
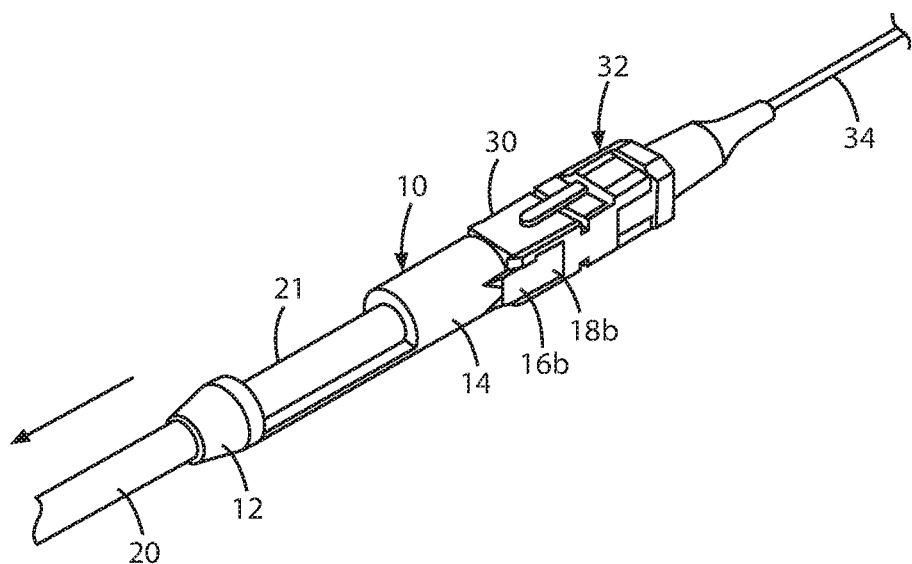
FIG. 4 is a view of the tool head and handle in FIG. 3 with the connector captured by the tool head.

Once the head portion 14 of the tool 10 engages the connector 32 as in FIG. 4, the proximal end 28 of the tool handle 20 (see FIG. 2) is inserted from one side of a premises wall into a wall opening or hole through which the fiber 24 is to be threaded. The handle 20 is long enough (e.g., about 12 inches) so that its proximal end 28 will emerge fully from the opposite side of the wall. Then, by pulling the proximal end 28 of the handle at the opposite side of the wall in the direction of the arrow in FIG. 4, the connector 32 can be drawn through the hole along with a sufficient length of the fiber 34 for routing over a remaining portion of the path at the premises.

If the fiber 34 is to be routed through another wall at the premises, the tool 10 can remain engaged with the connector 32 in order to thread the fiber through a hole formed in the other wall. When the tool 10 is no longer required, the connector 32 can be quickly released by spreading the tool fingers 16a, 16b so that the free ends 18a, 18b of the fingers are removed from the recesses 36 on the sides of the connector.

Figure 5:
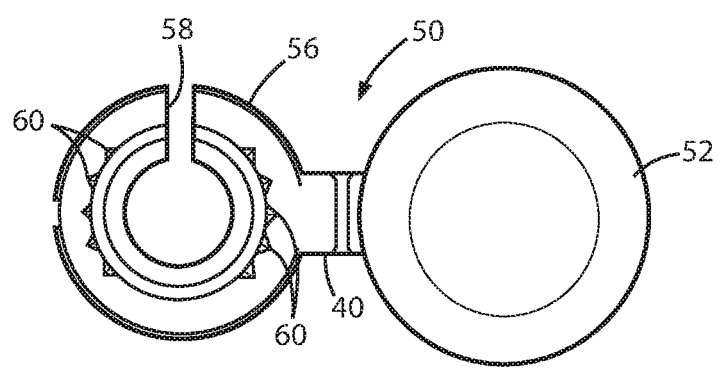
FIG. 5 is a bottom end view of a hole plug according to the invention, showing a cap of the plug in an open position.
Figure 6:
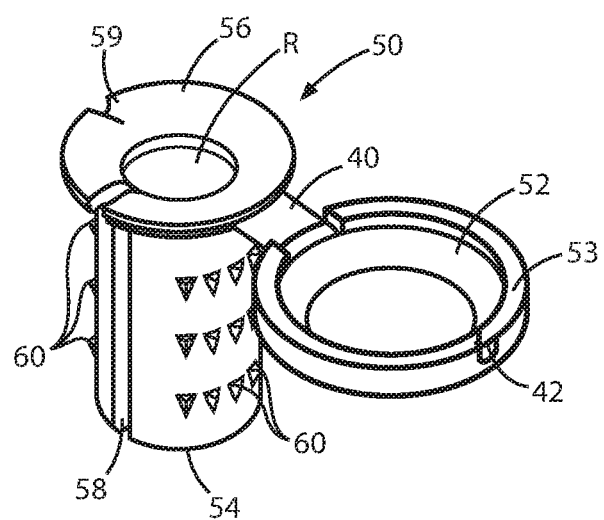
FIG. 6 is a perspective view of the hole plug in FIG. 5, as seen from a top end of the plug.

FIG. 5 is a bottom end view of a wall hole plug 50 according to the invention, showing a plug cap 52 in an open position. FIG. 6 is a perspective view of the plug 50 in FIG. 5 as seen from a top end of the plug.

The plug 50 and the cap 52 can be molded together as a unit from polypropylene copolymer or an equivalent material that complies with all applicable smoke and fire safety codes at the premises. The overall length of the plug 50 is, e.g., only about 0.800 inch. The plug 50 has an elongated, hollow cylindrical plug body 54 with an inside diameter of, e.g., about 0.276 inch and an outside diameter of, e.g., about 0.450 inch. The plug 50 also has an annular lip 56 that projects radially outward from the top end of the plug body 54, wherein the outside diameter of the lip 56 is, e.g., about 0.646 inch. Additionally, the plug 50 has an approx. 0.065 inch wide access slit 58 formed over the length of the plug through which an optical fiber or cable can be passed inside the plug body 54. The slit 58 also allows the circumference of the plug body 54 to contract when the plug 50 is inserted in a wall opening of smaller diameter in a premises wall.

Figure 7:
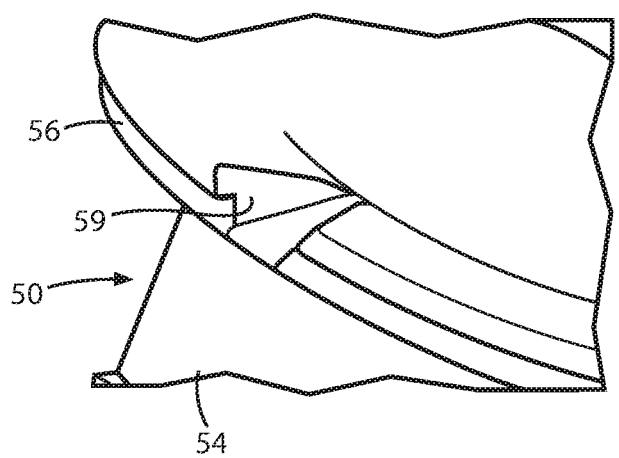
FIG. 7 is an enlarged view of the top end of the hole plug in FIG. 5, as seen from the rear in FIG. 6 and showing a fiber exit notch.

In the illustrated embodiment, the cap 52 is attached to the plug 50 by a live hinge 40. The hinge 40 is connected at one end to the circumference of the cap 52, and at the other end to the circumference of the lip 56 at the top end of the plug body 54. The lip 56 has a V-shaped notch or recess 59 formed on its top surface that extends from the inner to the outer circumference of the lip. The angular position of the notch 59 on the lip is diametrically opposed to that of the hinge 40. See FIGS. 6 and 7.

Figure 8:
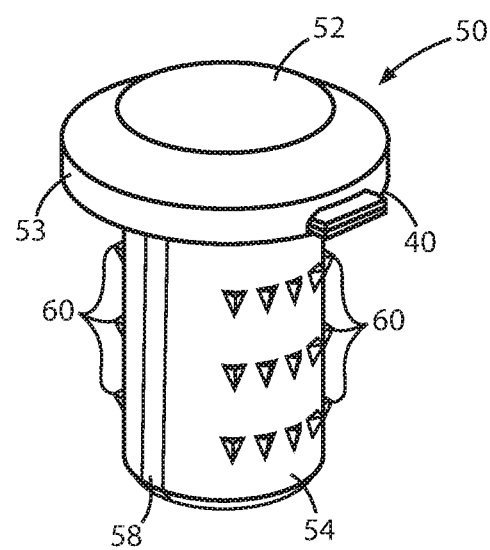
FIG. 8 is a view of the hole plug as in FIG. 6, with the cap in a closed position.

Further, the cap 52 has a rim 53 that is dimensioned and formed so that when the cap is swung via the hinge 40 from the open position in FIGS. 5 & 6 to a closed position shown in FIG. 8, the rim 53 snaps over the lip 56 to retain the cap 52 in the closed position atop the plug body 54. Also, the rim 53 has a small gap 42 located on its circumference so that when the cap 52 is closed, the gap 42 is aligned with the notch 59 in the lip 56 of the plug body. Thus, when the cap 52 is closed, the cap rim 53 will not interfere with a fiber or cable that is passed through the notch 59 from inside the plug body 54 and routed over a wall surface adjacent to the plug lip 56. A radius of curvature R between the top end of the plug body 54 and the inner circumference of the rim 53 is preferably not less than, e.g., about 0.110 inch (2.79 mm) to ensure the fiber or cable does not bend below a critical bend radius.

A group of radially outwardly projecting teeth 60 are formed on the outside circumference of the plug body 54, preferably at both sides of the access slit 58. Each one of the teeth 60 is about 0.050 inch wide and extends about 0.060 inch along the length of the plug body 54. As shown in the drawing, the teeth 60 are basically pyramidal in shape and have surfaces that are angled so as to enable the plug 50 to be fully inserted up to the lip 56 into a premises wall hole of about 0.500 inch diameter with only moderate force, but to resist removal of the plug from the hole by engaging the material of the wall surrounding the plug body 54. Moreover, once the plug 50 is inserted in the wall hole, the surfaces of the teeth 60 are angled so as to allow the plug to be turned about its axis with relatively little force to an angular position where the notch 59 in the plug lip 59 is aligned with a routing path on the wall, and to retain the plug securely in the wall at the aligned position.

Accordingly, the inventive plug 50 is particularly suitable for premises or dwelling units having relatively thin walls. The plug body 54 and the cap are 52 are integrally formed as one part, thus reducing the total number of parts required for a given installation and eliminating the possibility of loss if the caps are packaged separately. The plug 50 has a self retention feature such that once inserted in a wall hole, the plug can be turned to align with a fiber routing path on the same side of the wall, and the plug is securely retained in the hole at the aligned position. The notch 59 in the plug lip 56 allows a fiber or cable to be adhered directly to a wall surface adjacent to the notch, thus minimizing any negative visual impact of the fiber installation.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A tool for threading an optical fiber or cable through an opening or hole formed in a wall along a determined routing path at a customer premises, comprising:
    an elongated generally cylindrical tool body having an axis, a collar formed at a rear end of the tool body, and a head portion formed at a front end of the tool body;
    the head portion includes a pair of fingers that project axially in a forward direction, wherein the fingers are dimensioned and arranged to capture an optical connector at an end of an optical fiber or cable from a direction that approaches a front face of the connector;
    an elongated rod handle; and
    the collar at the rear end of the tool body has an opening formed axially through the collar for receiving and fixing a distal end of the rod handle in axial alignment with the tool body;
    wherein the rod handle is of a sufficient length so that when an optical connector at the end of an optical fiber or cable is captured by the head portion of the tool, and a proximal end of the rod handle is inserted from one side of a premises wall through a wall opening through which the fiber or cable is to be threaded, the proximal end of the rod handle emerges from the opposite side of the wall and the fiber or cable is threaded through the opening together with the captured optical connector when the proximal end of the rod handle is pulled in a direction away from the opposite side of the wall.

2. A tool according to claim 1, wherein the fingers at the head portion of the tool body have free ends dimensioned and arranged so that when the fingers are urged over the front face of a connector at an end of the optical fiber or cable, the fingers spread apart until the free ends engage the connector at corresponding recesses on the sides of the connector.

3. A tool according to claim 2, wherein the free ends of the fingers are hooked or barbed.

4. A tool according to claim 1, wherein a section of the length of the tool body intermediate the collar and the head portion is open over an arc of approximately 120 degrees.

5. A tool according to claim 1, wherein the rod handle has a length of about 12 inches.

6. A plug for insertion in an opening or hole formed in a premises wall through which hole an optical fiber or cable is threaded, comprising:
    a hollow cylindrical plug body having an outside diameter, an open top end, an open bottom end, and an access slit formed in the axial direction of the body for passing an optical fiber or cable inside the body to protect the fiber or cable inside the wall;
    wherein the plug body has a group of radially outwardly projecting teeth formed on the outside circumference of the body for engaging the premises wall and retaining the plug at a desired angular position when inserted in the hole in the premises wall;
    the top end of the plug body has a radially outwardly projecting lip, and the lip has a notch for aligning with a determined fiber routing path on a side of the wall in which the plug is inserted; and
    the teeth on the circumference of the plug body are basically pyramidal in shape and have surfaces that are angled (a) to enable the plug to be inserted into the hole up to the lip at the top end of the plug body with moderate force while engaging the material of the wall surrounding the hole to resist removal of the plug from the hole, and (b) to allow the inserted plug to turn about its axis with relatively little force to an angular position where the notch in the lip is aligned with a routing path on the wall, and to retain the plug in the hole at the aligned position.

7. A plug according to claim 6, wherein the plug body has two groups of radially outwardly projecting teeth formed on the outside circumference of the body, wherein each group is disposed on a corresponding side of the access slit.

8. A plug according to claim 6, including a cap for closing the open top end of the plug body.

9. A plug according to claim 8, including a hinge connected between the top end of the plug body and the cap.

10. A plug according to claim 6, wherein the access slit in the plug body is of such width as to allow the circumference of the body to contract when the plug is inserted in a wall hole having a diameter less than the outside diameter of the plug body.

11. A tool system for threading an optical fiber or cable through an opening or hole formed in a wall at a customer premises, and for protecting the fiber or cable inside the wall, comprising:

a tool having an elongated generally cylindrical tool body having an axis, a collar formed at a rear end of the tool body, and a head portion formed at a front end of the tool body;

the head portion includes a pair of fingers that project axially in a forward direction, wherein the fingers are dimensioned and arranged to capture an optical connector at an end of an optical fiber or cable from a direction that approaches a front face of the connector;

an elongated rod handle; and the collar at the rear end of the tool body has an opening formed axially through the collar for receiving and fixing a distal end of the rod handle in axial alignment with the tool body;

wherein the rod handle is of a sufficient length so that when an optical connector at the end of an optical fiber or cable is captured by the head portion of the tool, and a proximal end of the rod handle is inserted from one side of a premises wall through a wall opening through which the fiber or cable is to be threaded, the proximal end of the rod handle emerges from the opening on the opposite side of the wall and the fiber or cable is threaded through the opening together with the captured optical connector when the proximal end of the rod handle is pulled in a direction away from the opposite side of the wall; and a plug for insertion in the wall opening on either side of the wall, including;

a hollow cylindrical plug body having an outside diameter, an open top end, an open bottom end, and an access slit formed in the axial direction of the body for passing the threaded optical fiber or cable inside the body to protect the fiber or cable inside the wall;

wherein the plug body has a group of radially outwardly projecting teeth formed on the outside circumference of the body for engaging the premises wall and retaining the plug at a desired angular position in the wall; and the top end of the plug body has a radially outwardly projecting lip, and the lip has a notch for aligning with a determined routing path for the fiber or cable on a side of the wall in which the plug is inserted.

12. A tool system according to claim 11, wherein the projecting fingers at the front end of the tool head have free ends that are dimensioned and arranged so that when the fingers are urged over the front face of a connector at an end of the optical fiber or cable, the fingers spread apart until the free ends engage the connector at corresponding recesses on the sides of the connector.

13. A tool system according to claim 11, wherein the plug body has two groups of radially outwardly projecting teeth formed on the outside circumference of the body, wherein each group is disposed at a corresponding side of the access slit.

14. A tool system according to claim 11, including a cap for closing the open top end of the plug body, and a hinge connected between the top end of the plug body and the cap.

15. A tool system according to claim 11, wherein the teeth on the outside circumference of the plug body are dimensioned and configured to allow the body to turn about the axis of the body after the plug is inserted and retained in the wall hole, so that the notch in the lip at the top end of the plug body is aligned with the routing path on the side of the wall.

16. A tool for threading an optical fiber or cable through an opening or hole according to claim 1, wherein the rod handle is formed of acrylonitrile butadiene styrene (ABS).

17. A tool system for threading an optical fiber or cable through an opening or hole according to claim 11, wherein the rod handle of the tool is formed of acrylonitrile butadiene styrene (ABS).

\* \* \* \* \*